Dec. 30, 1969     R. A. McCARROLL     3,486,552

NOZZLE FOR INJECTION MOLDING

Filed June 16, 1967

INVENTOR.
RAYMOND A. MCCARROL
BY
WILSON, SETTLE & BATCHELDER

ATT'YS.

United States Patent Office 3,486,552
Patented Dec. 30, 1969

3,486,552
NOZZLE FOR INJECTION MOLDING
Raymond A. McCarroll, Grosse Pointe Woods, Mich., assignor to Acme Precision Products, Inc., Detroit, Mich., a corporation of Ohio
Filed June 16, 1967, Ser. No. 646,689
Int. Cl. B22d 17/28, 17/30
U.S. Cl. 164—337
1 Claim

ABSTRACT OF THE DISCLOSURE

The nozzle is useful in any application where molten metal, plastic or other material is forced through a nozzle into a die or mold. The nozzle is a tube made of a sintered carbide composition, and the tube has a hole extending through it of round or irregular cross-section and has male or female end portions shaped to fit sealing portions of the machine in which the nozzle is received. The sintered composition of the nozzle comprises essentially about 1% to about 30% of a binder material such as cobalt, nickel, molybdenum or mixtures thereof and the balance of tungsten carbide, tantalum carbide, titanium carbide, tantalum columbium carbide or mixtures thereof. This composition gives the nozzle unusually high resistance to heat, pressure and abrasion and great hardness such that the nozzle has a considerably longer useful life than previously used nozzles made of metals and alloys.

BACKGROUND OF THE INVENTION

One application for the nozzle of the invention is in a plunger die casting machine, a type of injection molding machine, in which the nozzle serves as a connector between a melt pot and a die. The plunger forces molten metal, which may be any ferrous or non-ferrous metal or alloy, from the melt pot through the nozzle into a die, and the plunger can apply any desired pressure to the molten metal that it forces into the die. The pressure usually applied ranges from 1,500 to 2,000 pounds per square inch. In addition to this high pressure, the nozzle is also subjected to a high temperature since the nozzle is usually heated by burners to keep it hot enough that the molten metal will not solidify as it passes through the nozzle. The combination of high pressure and high temperature plus the abrasion produced by the flowing metal tends to make the nozzle wear out rapidly. In the past, nozzles for die casting machines have been made of iron and steel including various steel alloys, but these nozzles have not had a very long useful life. Such metallic nozzles have often worn out in a period of time ranging from one hour to a month and then have either been discarded, or if not too badly worn, have been machined to renew them for further service. It would be very desirable to have a nozzle which would last considerably longer than the metallic nozzles available up to the present.

SUMMARY OF THE INVENTION

A nozzle of sintered metallic carbide material has been provided which has higher resistance to heat, pressure, and abrasion and greater hardness than metallic nozzles available up to the present time. As previously mentioned, the nozzle's composition comprises about 1% to about 30% by weight of a binder material such as cobalt, nickel, molybdenum or mixtures thereof, and the balance of tungsten carbide, tantalum carbide, titanium carbide, tantalum columbium carbide or mixtures thereof. The carbide nozzle lasts considerably longer than nozzles made of iron or steel in applications such as a plunger type die casting machine.

Accordingly, it is an object of this invention to provide a nozzle for an injection molding machine which has improved wear resistance as compared to known metal nozzles.

Another object of the invention is to provide a nozzle for injection molding machines which has unusually high resistance to heat, pressure and abrasion and great hardness.

A further object of the invention is to provide an injection nozzle of a sintered carbide composition which has a longer useful life than nozzles of known metal compositions.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
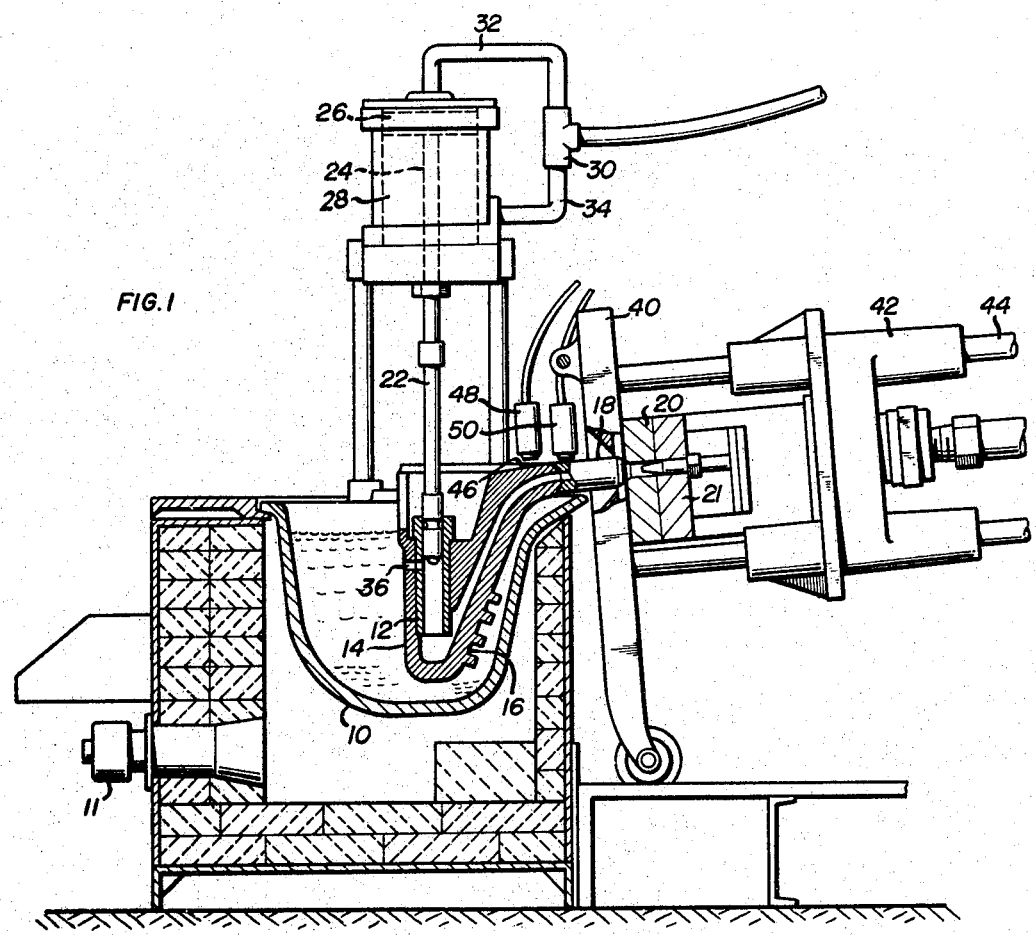
FIGURE 1 is a sectional view of a die casting machine for zinc alloy, showing a nozzle through which molten metal is injected into a die.

As shown on the drawings:

Plunger die casting machine of the type shown in FIGURE 1 are suited for casting of many metals and alloys, and they are commonly used for casting zinc alloys for example. In the machine of FIGURE 1, there is a melt pot 10 which holds the supply of molten metal. The melt pot is heated by means of a burner 11. Immersed in the molten metal is a fixed cylinder 12 retained in a holder 14 which has a spout 16 connected to a nozzle 18 which in turn is locked against or connected to a die 20. The nozzle 18 is the connector between the spout 16 and the die 20 and is the item which is made of carbide material in accordance with the invention. Before describing the nozzle in detail, however, the machine will be described briefly to give an idea of one typical application for the nozzle of the invention.

A plunger 22 operates in the cylinder 12 and is movable vertically upwardly and downwardly relative to the cylinder. The plunger 22 is connected to a piston rod 24 operated by a piston 26 contained in an air cylinder 28. Air is supplied to the cylinder 28 through a valve 30 and two inlet pipes 32 and 34. When air is admitted through inlet pipe 32, the piston 26 and piston rod 24 are forced downwardly, and when air is admitted to the cylinder 28 through inlet 34, the piston 26 and piston rod 24 are raised to the position shown in FIGURE 1.

When the plunger 22 is raised, it uncovers a port 36 extending through holder 14 into the interior of cylinder 12. The port 36 is below the level of the molten metal in melt pot 10, so when the port is uncovered, molten metal fills the interior of the cylinder and part way up into the spout 16. When the plunger is forced downward, the molten metal below it is forced out through the spout 16 and through the nozzle 18 into the dies 20 and 21 which have previously been locked together in a position abutting a fixed platen 40. After the molten metal solidifies in the dies, the dies 20 and 21 are opened by moving a movable platen 42 to the right along tie bars 44. The die casting is ejected, and at the same time the plunger 22 is raised back to its initial position. The platen 42 then moves to the left closing the dies 20 and 21, and the dies are locked again so that the cycle can be repeated.

The plunger 22 can subject the molten metal injected through the nozzle 18 to any desired pressure, and as previously mentioned, a pressure of from 1,500 to 2,000 pounds per square inch is typical. The nozzle 18 and the end portion 46 of the spout 16 may be heated by means of burners 48 and 50 so as to keep the molten metal from solidifying in the spout and the nozzle. Thus, the nozzle 18 is subjected to both high heat and high pressure which make it susceptible to wear. Also the flow of molten metals through the nozzle has an abrasive effect which further tends to wear out the nozzle. Nozzles made of iron and steel including steel alloys have not been able to withstand these forces to the desired degree, and such nozzles have worn out in a matter of some one hour to one month of service in the machine. It would clearly be desirable to provide a nozzle having a considerably longer useful life.

Figure 2:
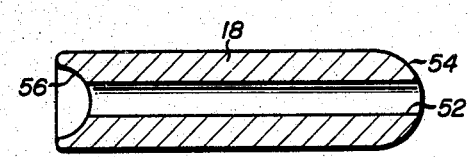
FIGURE 2 is a sectional view of a nozzle having one female end and one male end for use in the machine of FIGURE 1.

FIGURE 2 is an enlarged view of a nozzle 18 included in the machine of FIGURE 1. It may be seen that the nozzle is a tube which has a straight hole 52 of constant diameter extending longitudinally through it. The hole may have any desired configuration in cross-section. As shown in FIGURE 2, the right-hand end 54 of the nozzle has a spherically convex curvature to provide a male end, and the left-hand end 56 of the nozzle has a spherically concave curvature to provide a female end. These ends 54 and 56 fit with complementary curved sealing surfaces on the die 20 and the spout portion 46 to provide a continuous passage through the spout, the nozzle and into the die.

Figure 3:
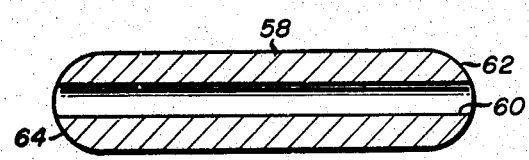
FIGURE 3 is a sectional view of a nozzle having two male ends which may also be used in a machine of the type shown in FIGURE 1.

FIGURE 3 shows a nozzle 58 also having a straight, constant diameter hole 60 extending longitudinally through it, but in this embodiment the nozzle has two male ends 62 and 64, each of spherically convex curvature. These ends 62 and 64 fit with spherically concave sealing surfaces on a spout and die to provide a continuous passage through the spout, nozzle and die.

Although two specific nozzle configurations have been shown in FIGURES 2 and 3, it is to be understood that the end portions of the nozzle may have any desired configuration so long as they cooperate with the sealing surfaces of the adjoining portions of the machine or so long as they are properly connected to those adjoining portions.

The nozzles 18 and 58 are made of a sintered carbide composition, and are capable of withstanding the high temperature, high pressure and abrasion to which the nozzle is subjected in the die casting machine of FIGURE 1 for considerably longer periods of time than previously used iron and steel compositions. As pointed out previously, the composition of the carbide nozzle comprises about 1% to about 30% by weight of a binder such as cobalt, nickel, molybdenum or mixtures thereof, and the balance of tungsten carbide, tantalum carbide, titanium carbide, tantalum columbium carbide or mixtures thereof. The carbide materials may be mixed in a proportion to provide desirable properties of strength and hardness. By way of example, the carbide nozzle may typically have a Rockwell hardness (A-scale) of about 87 to about 95, whereas steel and steel alloys can attain a Rockwell hardness (A-scale) of up to 70 to 72. In fact, only diamond is harder than the sintered carbide material.

The following table gives several typical compositions in percentages by weight for the material of the nozzle and also gives the hardness of the compositions.

| Hardness A-scale | Tungsten percent | Tantalum carbide, percent | Titanium carbide | Tantalum Columbian carbide, percent | Cobalt | Nickel | Molybdenum |
|---|---|---|---|---|---|---|---|
| 91–91.5 | 93 | | | | 7 | | |
| 91.7–92.2 | 94 | | | | 6 | | |
| 92.5–93 | 95.5 | | | | 4.5 | | |
| 92.7–93.2 | 97 | | | | 3 | | |
| 89.7–90.2 | 83.5 | 3.5 | | | 13 | | |
| 90.8–91.2 | 74.5 | 8 | | 10 | 7.5 | | |
| 91 | 75 | 13 | | 2 | 10 | | |
| 92 | 78 | 13 | | 2 | 7 | | |
| 92.8 | 83 | 13 | | 1 | 3 | | |
| 92.1 | 70 | | | | | 12 | 18 |
| 89.5 | 90 | | | | 10 | | |
| 90 | 83 | | 4 | | 13 | | |
| 88.5 | 87 | | | | 13 | | |
| 87.5 | 84 | | | | | 16 | |
| | 55 | 28 | | | 17 | | |

The carbide material may be made in two sintering stages. First the selected metals are mixed together with a small proportion of carbon. The mixture is pressed as in a cylinder into a chalk-like state, and this is known as the block state. This blocked material is then presintered to put the material in a form in which it is still machineable, and machining operations are carried out to put the nozzle in its final form. Then a final sintering operation is carried out at a temperature of about 5,000° F. to about 7,000° F., and the tantalum, titanium and/or tungsten material becomes a carbide material during this sintering operation. After the final sintering, the nozzle cannot be machined except with diamond tools.

From the foregoing description it is apparent that the invention provides an improved injection nozzle for die casting machines or other types of injection molding machines. The general wear resisting qualities of the carbide nozzle are unusually good, and the nozzle has an unusually long, useful life. With modern fabrication techniques, the nozzle can be made at reasonable cost, and, of course, the increased useful life of the carbide nozzle as compared to metal nozzles provides economies in the die casting operation.

Having thus described my invention, I claim:
1. In a plunger die casting machine including a melt pot containing a cylinder having a spout, a plunger reciprocable in the cylinder to inject molten metal through the spout, a die for receiving the molten metal to mold an article, a nozzle interconnecting the spout and the die for flow of molten metal under high pressure through the nozzle to the die, and means for heating the nozzle, the improvement wherein said nozzle is comprised of a sintered mixture of materials comprising about 1% to 30% by weight of a binder selected from the group consisting of cobalt, nickel, molybdenum and mixtures thereof, and the balance of at least one metal carbide selected from the group consisting of tungsten carbide, tantalum carbide, titanium carbide and tantalum columbium carbide, said nozzle having the shape of a tube with end portions shaped to fit sealing portions of said spout and said die, said nozzle having properties of high resistance to heat, pressure and abrasion and therefore being well suited to resist the heat, pressure and abrasion produced during injection of molten metal through said nozzle in said plunger die casting machine.

References Cited

UNITED STATES PATENTS

| 3,277,222 | 10/1966 | Vachet et al. | 106—43 X |
| 3,320,038 | 5/1967 | Scholz et al. | |

FOREIGN PATENTS

| 199,432 | 9/1958 | Austria. |
| 536,111 | 5/1941 | Great Britain. |

OTHER REFERENCES

Precision Metal Molding, vol. 24, No. 2, February 1966, TS200, p. 74, p. 32.

J. SPENCER OVERHOLSER, Primary Examiner

R. S. ANNEAR, Assistant Examiner

U.S. Cl. X.R.

164—303, 316; 239—602